United States Patent [19]
Battersby

[11] Patent Number: 6,069,650
[45] Date of Patent: May 30, 2000

[54] AUTOSTEREOSCOPIC DISPLAY APPARATUS

[75] Inventor: Stephen J. Battersby, Haywards Heath, United Kingdom

[73] Assignee: U.S. Philips Corporation, New York, N.Y.

[21] Appl. No.: 08/964,103

[22] Filed: Nov. 6, 1997

[30] Foreign Application Priority Data

Nov. 14, 1996 [GB] United Kingdom .................. 9623682

[51] Int. Cl.[7] .................................. H04N 13/00
[52] U.S. Cl. ....................... 348/59; 348/51; 359/463; 345/6
[58] Field of Search ................ 348/42, 51, 54, 348/55, 56, 59; 349/15; 359/462, 463; 353/7–8; 345/55, 87, 5, 6; 342/180, 176; 396/324, 327, 330

[56] References Cited

U.S. PATENT DOCUMENTS

| | | | |
|---|---|---|---|
| 4,214,257 | 7/1980 | Yamauchi | 348/51 |
| 5,101,279 | 3/1992 | Kurematsu et al. | 349/95 |
| 5,223,925 | 6/1993 | Hattori | 348/51 |
| 5,537,144 | 7/1996 | Faris | 348/58 |
| 5,572,341 | 11/1996 | Fergason | 359/39 |
| 5,678,089 | 10/1997 | Bacs, Jr. et al. | 396/324 |
| 5,696,552 | 12/1997 | Aritake et al. | 348/51 |
| 5,731,853 | 3/1998 | Taketomi et al. | 349/15 |
| 5,764,317 | 6/1998 | Sadovnik et al. | 349/5 |
| 5,771,121 | 6/1998 | Hentschke | 348/51 |
| 5,808,792 | 9/1998 | Woodgate et al. | 348/59 |

FOREIGN PATENT DOCUMENTS

| | | | |
|---|---|---|---|
| 0791847A1 | 8/1997 | European Pat. Off. | H04N 13/00 |
| 2196166 | 4/1988 | United Kingdom | G09F 9/00 |

OTHER PUBLICATIONS

"Multi–View 3D–LCD" By C. Van Berkel Et Al, SPIE Proceedings, vol. 2653, 1996 pp. 32–39.

*Primary Examiner*—Vu Le
*Attorney, Agent, or Firm*—F. Brice Faller

[57] ABSTRACT

An autostereoscopic display apparatus comprises a display device (10), for example a matrix LC display panel, for producing a display output consisting of rows and columns of pixels (12) and lenticular means (15) at the output side of the display device comprising an array of lenticular elements (16) through which different groups of pixels, forming one or more stereoscopic pairs, are seen by respective eyes of a viewer. The lenticular means includes electro-optic material (38) having an electrically—alterable refractive index and which can be selectively switched to remove the action of the lenticular elements thereby allowing high resolution 2-D images to be viewed.

9 Claims, 3 Drawing Sheets

AUTOSTEREOSCOPIC DISPLAY APPARATUS

BACKGROUND OF THE INVENTION

The present invention relates to an autostereoscopic display apparatus comprising an image display device for providing a display output composed of rows and columns of pixels and a lenticular means comprising an array of lenticular elements for directing the outputs from respective groups of pixels in mutually different directions so as to enable a stereoscopic image to be perceived.

Examples of such autostereoscopic display apparatus are described in the paper by C. van Berkel et al entitled "Multiview 3D—LCD" published in SPIE Proceedings Vol. 2653, 1996, pages 32 to 39 and in GB-A-2196166. In these examples the display device comprises a matrix LC (liquid crystal) display panel which has rows and columns of pixels (display elements) and which acts as a spatial light modulator to modulate light directed therethrough from a light source. The display panel can be of the kind used in other display applications, for example computer display screens for presenting display information in two dimensional form. A lenticular sheet, for example in the form of a molded or machined sheet of polymer material, overlies the output side of the display panel with its lenticular elements, comprising (semi) cylindrical lens elements, extending in the column direction with each lenticular element being associated with a respective group of two, or more, adjacent columns of display elements and extending parallel with the display element columns. In an arrangement in which each lenticular is associated with two columns of display elements, the display panel is driven to display a composite image comprising two 2D sub-images vertically interleaved, with alternate columns of display elements displaying the two images, and the display elements in each column providing a vertical slice of the respective 2D (sub) image. The lenticular sheet directs these two slices, and corresponding slices from the display element columns associated with the other lenticules, to the left and right eyes respectively of a viewer in front of the sheet so that, with the sub-images having appropriate binocular disparity, the viewer perceives a single stereoscopic image. In other, multi-view, arrangements, in which each lenticule is associated with a group of more than two adjacent display elements in the row direction and corresponding columns of display elements in each group are arranged appropriately to provide a vertical slice from a respective 2-D (sub-) image, then as a viewer's head moves a series of successive, different, stereoscopic views are perceived for creating, for example, a look-around impression. In view of the need for the lenticular elements to be accurately aligned with the display pixels, it is customary for the lenticular screen to be mounted over the display panel in a permanent manner so that the position of the lenticular elements is fixed in relation to the array of pixels.

Autostereoscopic display apparatus of this kind can be used for various applications, for example in medical imaging, virtual reality, games and CAD fields.

OBJECTS DESCRIPTION OF THE DRAWINGS

It is an object of the present invention to provide an improved autostereoscopic display apparatus which is capable of performing further display functions.

According to the present invention, the lenticular means comprises electro-optic material whose refractive index is switchable by selective application of an electrical potential thereto between a first value whereby the light output directing action of the lenticular means is provided and a second value whereby the light output directing action is removed. By switching the electro-optic material, therefore, the lens action of the lenticular means can be cancelled. In effect, the lenticular means can be switched "on" and "off". In one setting, the "on" mode, the lenticular means is operable to perform a lens action in the usual manner to direct the light outputs from groups of pixels appropriately and enable a stereoscopic image to be perceived when suitable stereoscopic sub-images are displayed on the image display device. In the other setting, the "off" mode, this lens action is removed and the lenticular means behaves like a simple sheet of transparent material thereby allowing the same display information to be received by both eyes of a viewer as in the case of a conventional two-dimensional display. This enables high resolution two dimensional display information to be viewed utilising for the display the full available horizontal resolution of the display device, as determined by the pixel columns. Thus, the apparatus can be used for 3-D stereoscopic displays and conventional 2-D displays of higher resolution e.g twice that of the 3-D displays, merely by switching the lenticular means between these two modes. In the known autostereoscopic display apparatus it is not possible to present a full resolution 2-D display in view of the lens action of the lenticular sheet. Also, because the display device and the lenticular sheet are normally fixedly mounted together in view of the requirement for accurate alignment it is not convenient simply to remove the lenticular screen in order to display 2-D images. The invention thus offers the significant advantage of enabling the same display apparatus to be used for both high resolution 2-D and 3-D display purposes. When used as, for example, as computer display screen, a user can simply switch between the 3-D display mode for stereoscopic images and the increased resolution 2-D display mode for text processing or the like as and when required.

In a preferred embodiment of the invention, the lenticular means comprises a lenticular sheet, similar to those used in the known apparatus, whose one side has a profiled surface defined by lenticular elements therein over which the electro-optic material is arranged with the side of the electro-optic material remote from that surface being generally flat, the refractive index of the electro-optic material being switchable between a value which is substantially similar to that of the material of the lenticular sheet and a different value. Transparent electrodes, across which an electrical potential is applied to control the refractive index of the electro-optic material, are provided adjacent respectively the flat side and the profiled surface of the lenticular sheet. With the potential across these electrodes set such that the refractive index of the electro-optic material differs from that of the lenticular sheet, the required lens action is obtained from the lenticular elements. With the applied potential being such that the refractive index of the electro-optic material substantially matches that of the lenticular sheet the combination of the lenticular sheet and the adjacent electro-optic material behave optically as a single, transparent, body and the lensing action of the lenticular elements is then removed.

It is envisaged that alternative forms of lenticular means could be employed. For example, the lenticular means may comprise a sheet of transparent polymeric material within whose thickness cavities are provided defining the lenticular elements and which are filled with electro-optic material with the control electrodes extending over the opposing sides of the sheet.

The electro-optic material preferably comprises a liquid crystal, typically a nematic liquid crystal although any suitable electro-optic material capable of being switched to provide the different refractive indices required may be used. In the above preferred embodiment, the liquid crystal is contained by a substrate of transparent material, e.g glass or plastics, spaced from the profiled surface of the lenticular sheet with the liquid crystal filling the gap between profiled surface and the substrate.

The lenticular means may be arranged to be switched between the two modes as a whole. Alternatively, it may be arranged to be switched in part only, such that a higher resolution 2-D display is obtained for example from one half of the overall display area, or in discrete portions of its area which constitute individually switchable windows enabling 3-D and 2-D displays to be provided simultaneously. This can be achieved simply by providing separate electrodes whose areas define, for example, the windows to which the electrical potentials for switching can be applied individually and selectively.

BRIEF DESCRIPTION OF THE DRAWINGS

Embodiments of autostereoscopic display apparatus in accordance with the invention will now be described, by way of example, with reference to the accompanying drawings, in which.

It should be understood that the Figures are merely schematic and are not drawn to scale. In particular, certain dimensions may have been exaggerated whilst other have been reduced. The same reference numerals are used throughout the drawings to indicate the same or similar parts.

DESCRIPTION OF THE PREFERRED EMBODIMENTS

Figure 1:
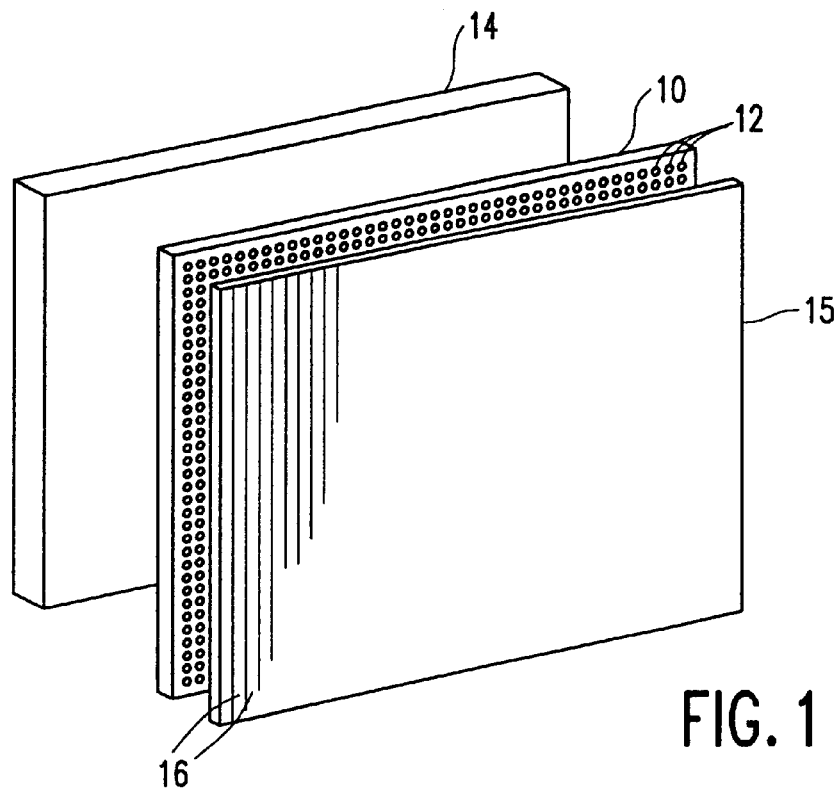
FIG. 1 is a schematic perspective view of the apparatus.

Referring to FIG. 1, the apparatus comprises a matrix display device acting as a spatial light modulator and comprising an active matrix LC display panel 10 having a planar array of individually addressable, regularly-spaced and similarly-sized pixels (display elements) 12 arranged in aligned rows and columns perpendicularly to one another. The pixels are shown schematically with only a comparatively few in each row and column for simplicity. The display panel 10 is illuminated by a light source 14 which can be of any suitable kind and in this example comprises a planar back-light co-extensive with the area of the pixel array. Light incident on the panel is modulated by the individual pixels by the application of appropriate drive voltages thereto so as to produce the desired image display output.

Overlying the output side of the display panel 10, there is disposed a lenticular means 15 providing an array of elongate, parallel, lenticular elements 16. The lenticular elements 16 comprise optically cylindrically converging lenticules, for example formed as convex cylindrical lenses which extend parallel to the pixel columns and serve in known manner to provide separate images, which are generated in the pixel array of the panel 10 in a vertically interleaved fashion, to the two eyes of a viewer facing the side of the sheet 15 remote from the panel 10 so as to produce a stereoscopic display. Autostereoscopic display apparatus using lenticular sheets in conjunction with matrix display panels are well known and it is not thought necessary to describe here in detail their operation. Examples of such apparatus and their operation are described in the aforementioned papers by C. van Berkel et al and in GB-A-2196166 to which reference is invited. Each lenticular element 16 may overlie a respective group of two, three, or more, adjacent columns of pixels, to provide a corresponding number of views. Each lenticular element provides a spatially discrete output beam from each of the associated pixel columns in mutually different, angular directions. The display panel is driven so that a narrow vertical slice of a 2-D (sub) image is produced by each column of pixels with the display produced comprising a plurality of interleaved 2-D (sub) images which are to be seen by the left and right eye respectively of a viewer. Each lenticular element 16 thus provides a plurality of output beams, one from each of its associated columns of pixels, whose optical axes are in mutually different directions and angularly spread around the longitudinal axis of the lenticular element. With appropriate 2-D image information applied to respective columns of display elements then to a viewer whose eyes receive different ones of the beams a 3-D image is perceived. With each lenticular element being associated with several pixel columns then different stereoscopic images can be viewed as the viewer's head moves in the row direction.

Figure 2:
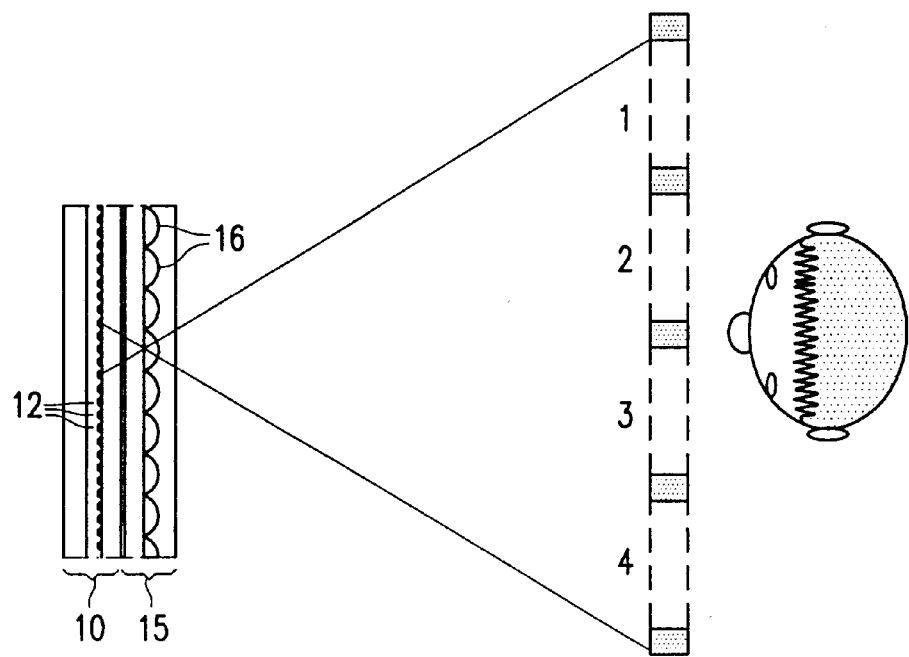
FIG. 2 is a plan schematic view of part of the apparatus operating, for example, to provide four views.

FIG. 2 illustrates, in plan view, the operation of the apparatus in producing, in this example, a four view display output, in which each lenticular element 16 overlies a respective group of four adjacent pixel columns such that four vertical strips, each representing a vertical slice of a respective 2-D view, are presented to the viewer. With appropriate 2-D image information applied to the pixels, and with the viewer's eyes being at a suitable distance to receive different ones of the output beams, a 3-D image is perceived. As the viewer's head moves in the row direction, three stereoscopic images can be viewed in succession. The numbers 1 to 4 denote the vertical slices of the corresponding views. The other lenticular elements provide similar slices. Thus, with the viewer's eyes situated as shown a stereoscopic image comprised of views 2 and 3 will be seen. By moving sideways the viewer will see two other stereoscopic images composed of views 1 and 2 and views 3 and 4. Of course, the number of views provided can be varied from just two views giving a single stereoscopic image to more than four views, for example seven views providing six stereoscopic images.

If, for example, a standard SVGA type LC display panel is used, having an array of 800 (row) by 600 (column) pixels (each comprising three different colour sub-pixels in the case of a colour display) then for a four view system providing three stereo pairs, at a fixed viewing distance, the resulting display would have a resolution of 200 in the horizontal, row, direction and 600 in the vertical, column, direction.

The lenticular means 15 of the apparatus is controllable such that the lens action of the lenticular elements 16 can in effect be switched on and off. In the "on" setting the lenticular means behaves as described above. In the "off" setting the lenticular means 15 behaves as if it were merely a simple sheet of transparent material. Thus, with the lenticular means in the off setting and with the pixels of the display panel being driven to present a 2-D image, this 2-D image is seen by both eyes of the viewer and by utilising all the available columns of pixels in the panel the viewer will see a 2-D image whose horizontal resolution (800) is considerably increased compared with that obtained for each stereo view. The ability to switch the lenticular means in this manner enables the display apparatus to be used not only to provide stereoscopic images but to provide also higher resolution 2-D images, as required for text display for example, when desired.

Figure 3:
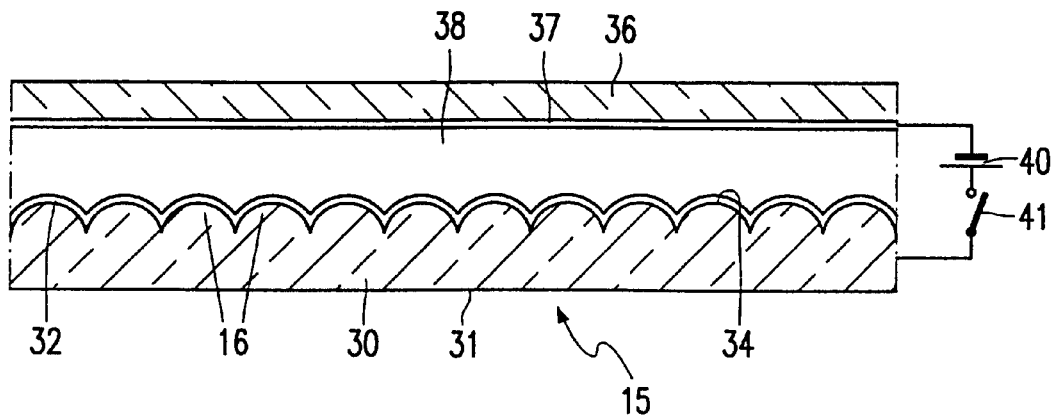
FIG. 3 is a schematic perspective view of a part of one embodiment of a lenticular means used in the apparatus.

FIG. 3 is a schematic perspective view of the lenticular means 15 used in this embodiment. The lenticular means comprises a lenticular sheet 30 of generally conventional kind and having an array of juxtaposed parallel lenticular elements 16 in the form of convex cylindrical lenses and molded (or machined) from optically transparent polymeric material. Alternatively, the lenticular elements may be formed using a photolithographic process in known manner. One side 31 of this sheet is flat while its other side 32 comprises a profiled (convex-ribbed) surface as determined by the contours of the lenticular elements. The profiled surface is covered by a thin layer 34 of transparent, electrically conductive material such as ITO which serves as an electrode. A transparent, flat-surfaced, plate 36 of glass or plastics material is arranged overlying and spaced from the lenticular sheet 30 and carries on its surface facing the sheet a thin, electrically conductive, and transparent layer 37, again for example of ITO, serving an opposing electrode. An electro-optic material 38 whose refractive index can be altered by the selective application of electrical potential thereacross is disposed between the sheet 30 and the plate 36. The space between the sheet 30 and the plate 36 is completely filled by this material so that the material 38 is contiguous with the profiled surface of the sheet 30. In this example, the electro-optic material 38 comprises a suitable liquid crystal material, generally a nematic liquid crystal, which is sandwiched between the sheet 30 and the plate 36, or more precisely the covering electrodes 34 and 37, in a manner analogous to that conventionally used in the manufacture of liquid crystal display devices with seals being provided around the periphery of the lenticular means to retain the material. As will be appreciated by persons skilled in the art of liquid crystal displays, appropriate orientation layers, are provided on one or both of the electrodes 34 and 37.

The lenticular means 15 thus consists of a lenticular sheet 30 and a contiguous LC cell, constituted by the parts 34,38,37,36 whose adjoining surfaces conform with one another.

The selective application of an electrical potential to the electrodes 34 and 37 is illustrated in simple manner in FIG. 3 by a potential source 40 and switch 41.

Assuming, for example, that with no potential applied between the electrodes 34 and 37 the liquid crystal material 38 is oriented such that its refractive index, in the direction of view, differs from, and more particularly is lower than, that of the material used for the sheet 30 and that when a predetermined potential is applied to the electrodes the liquid crystal is oriented such that its refractive index in the direction of view is changed and substantially matches that of the sheet 30 then it will be appreciated that the lens action of the lenticular elements 16 will effectively be turned on and off. In the absence of an applied electrical potential the lenticular means 15 behaves much the same as would the lenticular sheet 30 by itself so that with the output side of the display panel 10 positioned closely adjacent the flat, outer, side 31 of the lenticular sheet 30, the lenticular means 15 operates in the manner of a conventional lenticular sheet to direct sub-image displays on the panel to different eyes of the viewer thereby enabling a stereoscopic image to be seen. With an electrical potential applied across the material 38 so that its refractive index in the viewing direction becomes substantially the same as that of the sheet 30, the lens action of the lenticular elements 16 is removed and the lenticular means 15 behaves like a light transmissive plate overlying the display panel with the path of the light output from the display panel 10 being substantially unaffected. In this case a 2-D image displayed in the display panel will be seen by a viewer as a 2-D image with a resolution as determined by the display panel (e.g 800 by 600) and as if the lenticular means 15 were not present.

Figure 4A:
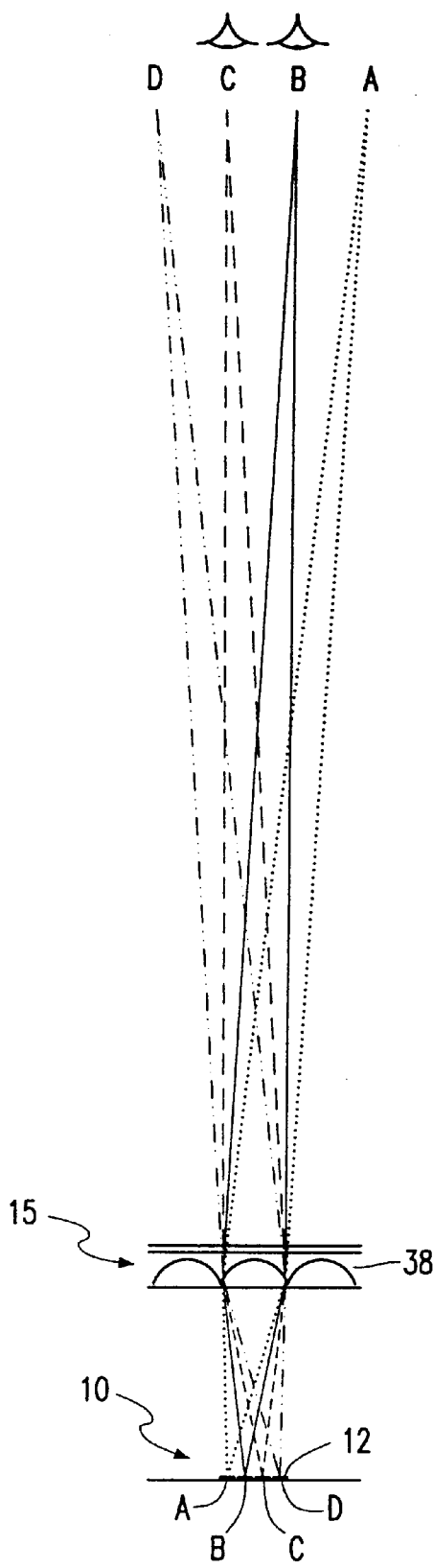
FIGS. 4A and 4B illustrate the operation of the lenticular means in two different modes.
Figure 4B:
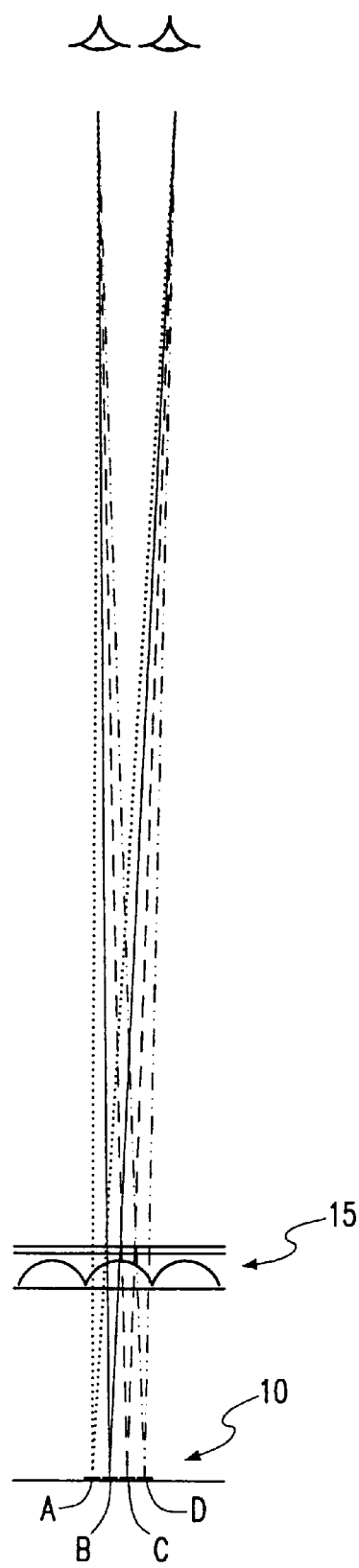

The two operational modes are illustrated schematically in FIGS. 4A and 4B respectively which show in plan view a part of the combination display panel 10 and lenticular means 15 and example light paths for a typical lenticular element 16 and its associated four columns of pixels 12, A to D. FIG. 4A illustrates the "on" mode in which light from each of the four columns of pixels (A to D) associated with the lenticular element, whose paths are indicated by the solid lines, dotted lines, dashed lines and dot-dashed lines respectively, is directed in mutually different directions towards a viewer's eyes by virtue of the lens action of the lenticular element so that a viewer sees a different pixel column in each eye. The lens action of the lenticular element 16 forms an image of the pixel columns A to D close to the eye positions. FIG. 4B illustrates the "off" mode in which the separating lens action is removed and the viewer sees all four pixel columns A to D with each eye.

The electrodes 34 and 37 may extend completely over the areas of the sheet 30 and the plate 36 respectively so that the lenticular means 15 switches between its two operations modes as a whole. If desired, the electrodes 34 and 37 may extend, in registration, over a part only of the total area of the lenticular array so that a portion only of the lenticular means, corresponding to the area of the overlapping electrodes, is switchable so as to enable, for example, a 2-D text image to be displayed in a dedicated part of the display area alongside a 3-D image simultaneously. Alternatively, each electrode may comprise a plurality of discrete area electrodes, respective pairs of such discrete electrodes on the sheet 30 and the plate 36 being in registration with one another, with each respective pair being individually addressable to apply selectively thereto an electrical potential to change the refractive index of the LC material over the area defined by the electrode pair independently of the areas defined by the other electrode pairs. Thus, discrete areas of the lenticular means may be switched either alone or in combination to provide in effect one or more windows in a 3-D display in which 2-D text images for example are displayed, or vice versa one or more windows in a 2-D image in which a 3-D display is produced.

Figure 5:
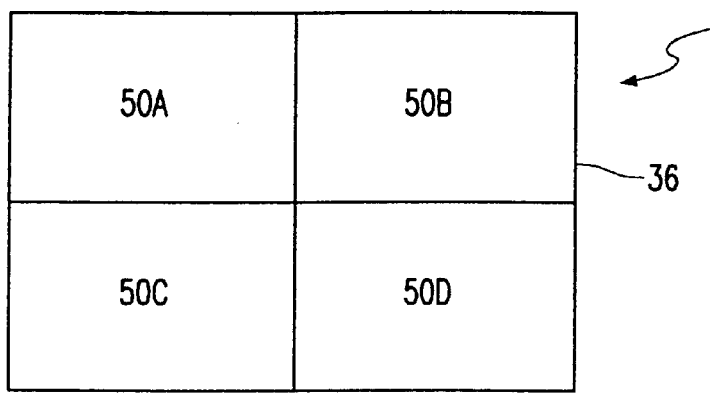
FIG. 5 illustrates a modified form of the lenticular means.

By way of example, and with reference to FIG. 5 which shows schematically a frontal view of the lenticular means 15, the electrodes 34 and 37 may be divided to define four equal quadrants 50A–50D, together covering the area of the lenticular array, which are each switchable independently. The individual regions can be switched either above or in combination. By switching all four quadrants together, an effect analogous to that using electrodes which cover completely the sheet 30 and the plate 36 is achieved.

With regard to the embodiment of FIG. 3, it will be appreciated that the lenticular means 15 could be arranged inverted such that the LC layer 38 rather than the sheet 30 is adjacent the LC display panel and so that the flat outer surface of the sheet 30 becomes the output side of the lenticular means rather than the plate 36. In this case, the plate 36 may comprise a transparent substrate of the LC display panel.

Figure 6:
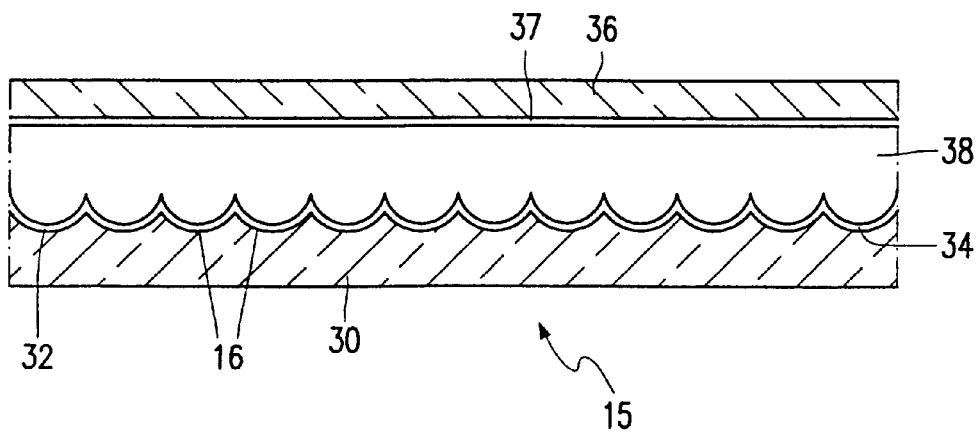
FIG. 6 shows schematically in section a part of another embodiment of a lenticular means used in the apparatus.

It will also be appreciated the profile of the adjoining surfaces of the sheet 30 and the LC layer 38 could be opposite to that shown. The surface of the lenticular sheet may instead be formed with a concave ribbed profile, as illustrated in FIG. 6 which shows schematically a cross-section through another embodiment of the lenticular means 15. The sheet 30 thus provides an array of elongate, parallel, optically cylindrically diverging lenticular elements formed as concave cylindrical lenses. In this case the LC material is such that its refractive index is switchable between a value which is higher than that of the material of the sheet 30, so that the necessary lens action required for stereoscopic display is achieved, and a value which substantially matches that of the sheet 30 so that the lens action is cancelled enabling 2-D images displayed on the display panel to be viewed in full resolution.

Of course, the number of pixel columns associated with each lenticular element can be varied so as to provide more, or less, stereoscopic pairs.

While in the above described embodiments a lenticular sheet having an array of elongate, cylindrical, lenticular elements has been used, it will be understood that the lenticular sheet could instead comprise an array of spherical microlens elements instead, such spherical lens elements lenticular sheets already being known in the field of autostereoscopic display apparatus.

Also, the lenticular elements need not extent parallel to the pixel columns but could instead be slightly slanted with respect to the pixel columns, as described in EP-A-0 791847.

In summary, therefore, an autostereoscopic display apparatus has been disclosed which comprises a display device for example a matrix LC display panel, for producing a display output consisting of rows and columns of pixels and lenticular means at the output side of the display device comprising an array of lenticular elements through which different groups of pixels, forming one or more stereoscopic pairs, are seen by respective eyes of a viewer, and in which the lenticular means includes electro-optic material having an electrically—alterable refractive index and which can be selectively switched to remove the action of the lenticular elements thereby allowing high resolution 2-D images to be viewed.

From reading the present disclosure, other modifications will be apparent to persons skilled in the art. Such modifications may involve other features which are already known in the field of autostereoscopic display apparatus and component parts thereof and which may be used instead of or in addition to features already described herein.

I claim:

1. An autostereoscopic display apparatus comprising an image display device for providing a display output composed of pixels in a row and column array and lenticular means comprising an array of lenticular elements for directing the outputs from respective groups of pixels in mutually different directions so as to enable a stereoscopic image to be perceived, characterised in that the lenticular means further comprises electro-optic material whose refractive index is switchable by selective application of an electrical potential thereto between a first value whereby the light output directing action of the lenticular elements in mutually different directions is maintained and a second value whereby the light output directing action is removed.

2. An autostereoscopic display apparatus according to claim 1, characterised in that the lenticular means comprises a lenticular sheet comprising a material with a refractive index and a profiled surface defined by the array of lenticular elements and the electro-optic material overlies said surface, the electro-optic material having a generally flat side remote from the profiled surface and having a refractive index which is switchable between a value which is substantially similar to the refractive index of the material of the lenticular sheet and a different value.

3. An autostereoscopic display apparatus according to claim 2, characterised in that the electro-optic material comprises a liquid crystal material.

4. An autostereoscopic display apparatus according to claim 3, further comprising a transparent plate spaced from the profiled surface of the lenticular sheet with the liquid crystal material disposed therebetween.

5. An autostereoscopic display apparatus according to claim 4, characterised in that the transparent plate comprises a substrate of the image display device.

6. An autostereoscopic display as in claim 2 wherein the lenticular elements of the profiled surface are convex, and the different value of refractive index of the electro-optic material is lower than the refractive index of the material of the lenticular sheet.

7. An autostereoscopic display device as in claim 2 wherein the lenticular elements of the profiled surface are concave, and the different value of refractive index of the electro-optic material is higher than the refractive index of the material of the lenticular sheet.

8. An autostereoscopic display apparatus according to claim 1, characterised in that the lenticular means comprises a plurality of separate regions each of which is individually switchable.

9. An autostereoscopic display apparatus according claim 1, characterised in that the image display device comprises a liquid crystal display device.

* * * * *